ated Aug. 5, 1958

United States Patent Office

2,846,465
CARBAMATES OF BICYCLIC ALCOHOLS

Werner R. Boehme, Somerville, and Joseph Nichols, Princeton, N. J., assignors to Ethicon, Inc., a corporation of New Jersey No Drawing. Application March 26, 1956
Serial No. 573,635

2 Claims. (Cl. 260—482)

The present invention relates to new phamaceutically effective carbamates of bicyclic alcohols which have especially advantage use as anticonvulsants and hypnotics. The new carbamates of bicyclic alcohols of this invention are represented by the following planar structural formula:

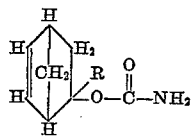

where R is hydrogen or a straight or branched-chain alkyl radical, preferably having not more than six carbon atoms.

The following structural formula shows the spatial relationships of the exo and endo positions of substituent groups on a bicycloheptane nucleus. Exo and endo positions of substituent groups have a corresponding spatial relationship on bicycloheptene nuclei.

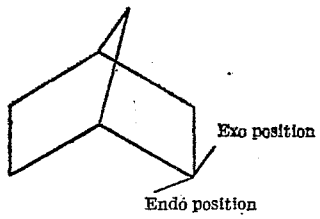

The new carbamates of bicyclic alcohols of the present invention have especially advantageous utility as anticonvulsants when employed in the treatment of epileptiform disorders and also have utility as hypnotics.

The novel carbamates of bicyclic alcohols of this invention may be prepared by the reaction of a substituted or unsubstituted bicyclic alcohol with cyanic acid or urea. They may also be obtained from an ester of the substituted or unsubstituted bicyclic alcohols by transesterification with a lower alkyl carbamate in the presence of an alkaline catalyst or by ammonolysis of the esters with chloroformic acid.

The substituted or unsubstituted bicyclic alcohols may be prepared by Diels-Alder addition of a conjugated diene such as cyclopentadiene with an ethylenic alcohol ester according to the method of Alder and Windemuth, U. S. Patent No. 2,352,606, and subsequent hydrolysis of the ester adduct. The substitute or unsubstituted bicyclic alcohols may also be prepared by a reduction of the corresponding cyclic ketones or esters of bicyclic alcohols with lithium aluminum hydride.

For the purpose of illustration, the following example is set forth to illustrate the preparation of a novel compound, 2-endocarbamyloxybicyclo-(2,2,1)-5-heptene, of this invention, but is not to be construed as limiting the invention or its scope.

A mixture of 25.5 grams of 2-endohydroxybicyclo-(2,2,1)-5-heptene, which was prepared according to the method of Alder and Rickert, Annalen der Chemie, volume 543, page 1 (1940), and 15.3 grams of urea was heated at 170° C. for four hours. The cooled melt was extracted with 300 cc. of boiling hexane. 2-endocarbamyloxybicyclo-(2,2,1)-5-heptene separated in crystalline form from the cooled hexane solution and was removed and recrystallized from hexane. The recrystallized product had a melting point of 109–110° C.

Calculated for $C_8H_{11}NO_2$: Carbon=62.72%; hydrogen = 7.24%; nitrogen = 9.14%. Found: Carbon = 62.50%; hydrogen=7.21%; nitrogen=9.45%.

2-endocarbamyloxybicyclo-(2,2,1)-5-heptene was tested for anticonvulsant activity by the method of Swinyard, Brown and Goodman, Journal of Pharmacology and Experimental Therapeutics, volume 106, page 319 (1952), for measuring its action against electroshock-induced convulsions. The ability of the substance to induce sleep, sleep being defined as the period during which the animal fails to assume a normal position when placed on its back, was determined by the Method of P'An, Gardocki, Harfenist and Bavley, Journal of Pharmacology and Experimental Therapeutics, volume 107, page 459 (1953), the ability to induce sleep in animals being an accepted indication of hypnotic activity. The $LD_{50}$ value of the substance was determined by oral administration to mice and calculated according to the method of Litchfield and Wilcoxon, Journal of Pharmacology and Experimental Therapeutics, volume 96, page 99 (1949). The median effective dose of 2-endocarbamyloxybicyclo-(2,2,1)-5-heptene which prevented, in fifty percent of the mice to which the substance was given orally, a tonic extensor component of the convulsion of the hind leg induced by a current strength of fifty milliamperes applied for a duration of two-tenths of a second was 254 milligrams per kilo of body weight. The median effective dose of 2-endocarbamyloxybicyclo-(2,2,1)-5-heptene which caused hypnosis in fifty percent of the mice to which the substance was given orally was about 800 milligrams per kilogram of body weight. 2-endocarbamyloxybicyclo-(2,2,1)-5-heptene was found to have an $LD_{50}$ value of 891 milligrams of the substance per kilogram of body weight, which is the median dose required to kill fifty percent of the mice to which the substance was given orally.

While the invention has been illustrated by certain individual specific embodiments, it is understood that variations, substitutions and modifications may be made to the extent of the scope of the appended claims.

What is claimed is:

1. Carbamates of bicyclic alcohols having the general planar structural formula:

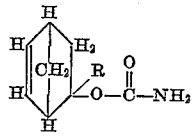

in which R is selected from the class consisting of hydrogen saturated straight chain alkyl radicals of 1–6 carbon atoms, and saturated branched chain alkyl radicals of 3–6 carbon atoms.

2. 2-endocarbamyloxybicyclo-(2,2,1)-5-heptene.

No references cited.